United States Patent [19]

Nakanishi et al.

[11] Patent Number: 4,519,346
[45] Date of Patent: May 28, 1985

[54] HELICALLY-SHAPED INTAKE PORT OF AN INTERNAL COMBUSTION ENGINE

[75] Inventors: Kiyoshi Nakanishi; Takeshi Okumura, both of Susono, Japan

[73] Assignee: Toyota Jidosha Kogyo Kabushiki Kaisha, Toyota, Japan

[21] Appl. No.: 290,100

[22] Filed: Aug. 4, 1981

Related U.S. Application Data

[63] Continuation of Ser. No. 38,819, May 14, 1979, abandoned.

[30] Foreign Application Priority Data

Sep. 25, 1978 [JP] Japan ................................ 53-116666

[51] Int. Cl.³ ............................................. F02M 35/10
[52] U.S. Cl. ................................ 123/188 M; 123/306
[58] Field of Search ................ 123/52 M, 188 M, 306

[56] References Cited

U.S. PATENT DOCUMENTS

| | | | |
|---|---|---|---|
| 3,020,896 | 2/1962 | Meurer et al. | 123/188 M |
| 3,273,551 | 9/1966 | Julien et al. | 123/188 M |
| 3,335,707 | 8/1967 | Heinrich | 123/188 M |

FOREIGN PATENT DOCUMENTS

| | | | |
|---|---|---|---|
| 1956351 | 5/1971 | Fed. Rep. of Germany | 123/188 M |
| 2242383 | 3/1974 | Fed. Rep. of Germany | 123/188 M |
| 2643648 | 7/1977 | Fed. Rep. of Germany | 123/188 M |
| 192366 | 11/1964 | Sweden | 123/188 M |
| 1259484 | 1/1972 | United Kingdom | 123/188 M |

Primary Examiner—Parshotam S. Lall
Assistant Examiner—W. R. Wolfe
Attorney, Agent, or Firm—Kenyon & Kenyon

[57] ABSTRACT

A helically-shaped intake port comprising a helical portion and an inlet passage portion which is tangentially connected to the helical portion and extends so as to be slightly curved. The intake valve is arranged at the outlet open end of the helical portion. The first side wall of the inlet passage portion, which is located near the axis of the intake valve, has on its upper portion an inclined wall portion which is arranged to be directed downwards. The width of the inclined wall portion of the inlet passage portion is gradually increased towards the helical portion. The second side wall of the inlet passage portion, which is located remote from the axis of the intake valve, is vertically arranged and smoothly connected to the peripheral side wall of the helical portion, which extends circumferentially about the axis of the intake valve.

10 Claims, 11 Drawing Figures

HELICALLY-SHAPED INTAKE PORT OF AN INTERNAL COMBUSTION ENGINE

This is a continuation of application Ser. No. 38,819 filed on May 14, 1979 now abandoned.

DESCRIPTION OF THE INVENTION

The present invention relates to a helically-shaped intake port of an internal combustion engine.

Particularly in a compression-ignition type internal combustion engine, in order to create a strong swirl motion in the combustion chamber of an engine at the time of the intake stroke, a helically-shaped intake port comprising a substantially straight inlet passage portion and a helical portion is used. However, even if such a helically-shaped intake port is applied to a spark-ignition type gasoline engine and, in addition, a slight change of the construction of the helically-shaped intake port is effected so as to create a swirl motion of the strength necessary to obtain a good combustion when an engine is operating under a light load, since the engine speed normally used in a gasoline engine is considerably greater than that normally used in a compression-ignition type engine, the flow resistance which the mixture flowing in the helically-shaped intake port is subjected to becomes large in a gasoline engine. As a result of this, a problem occurs in which the volumetric efficiency is reduced when a gasoline engine is operating at a high speed under a heavy load.

An object of the present invention is to provide a helically-shaped intake port having a novel construction which is capable of creating a strong swirl motion in the combustion chamber when an engine is operating under a light load, while ensuring a high volumetric efficiency when an engine is operating at a high speed under a heavy load.

According to the present invention, there is provided a helically-shaped intake port of an internal combustion engine, which comprises: a helical portion having an outlet open end and an intake valve arranged at said outlet open end, said helical portion being defined by an upper wall and a peripheral side wall which extends circumferentially about an axis of said intake valve, and; an inlet passage portion tangentially connected to said helical portion and having an inlet open end, said inlet passage portion being defined by an upper wall, a bottom wall, a first side wall arranged at a position near the axis of said intake valve, and a second side wall arranged at a position remote from the axis of said intake valve and connected to the peripheral side wall of said helical portion, wherein the first side wall of said inlet passage portion has an inclined wall portion which is arranged to be directed downwards.

The present invention may be more fully understood from the description of a preferred embodiment of the invention set forth below, together with the accompanying drawings.

DESCRIPTION OF A PREFERRED EMBODIMENT

Figure 1:
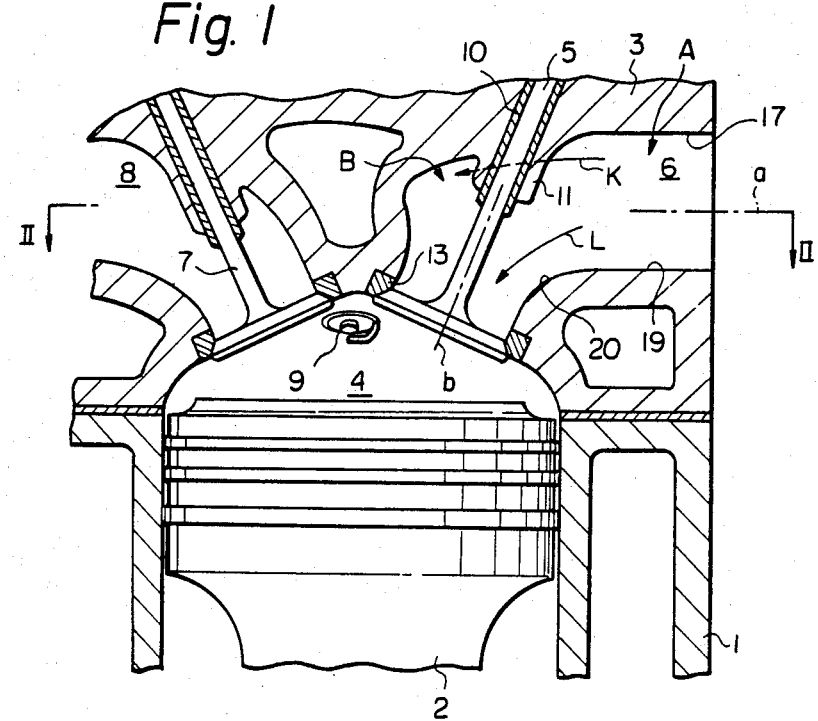
FIG. 1 is a cross-sectional side view of an internal combustion engine equipped with a helically-shaped intake port according to the present invention.
Figure 2:
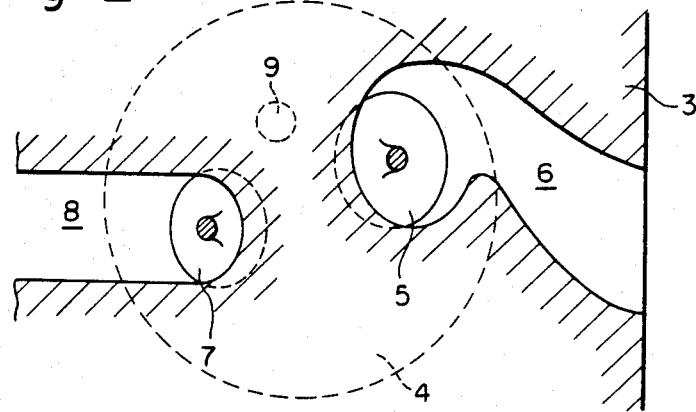
FIG. 2 is a cross-sectional plan view taken along the line II—II in FIG. 1.
Figure 3:
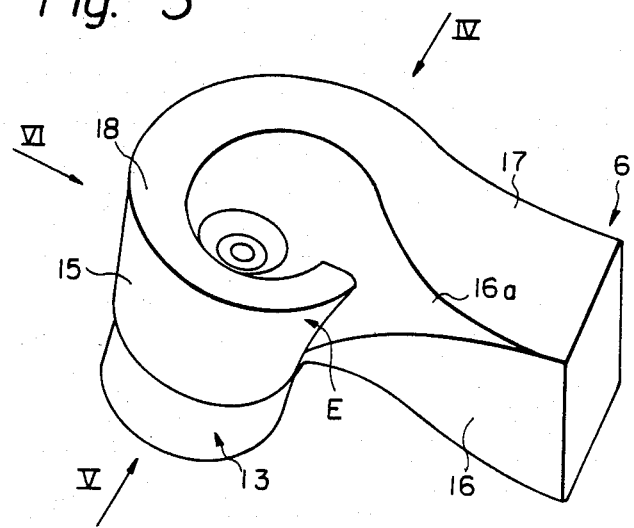
FIG. 3 is a perspective view of a helically shaped intake port schematically illustrating the helically shaped intake port illustrated in FIG. 1.

Referring to FIGS. 1 and 2, 1 designates a cylinder block, 2 a piston reciprocally movable in the cylinder block 1; 3 a cylinder head fixed onto the cylinder block 1 and 4 a combustion chamber formed between the piston 2 and the cylinder head 3; 5 designates an intake valve, 6 a helically-shaped intake port formed in the cylinder head, 7 an exhaust valve, 8 an exhaust port and 9 a spark plug. As is illustrated in FIG. 1, a cylindrical projection 11, projecting downwardly for supporting a valve guide 10, is formed in one piece on the upper inner wall of the helically-shaped intake port 6, and the tip of the valve guide 10 projects from the tip of the cylindrical projection 11. At the time of the intake stroke, the mixture formed in the carburetor (not shown) is introduced into the combustion chamber 4 via the helically-shaped intake port 6 and the intake valve 5 and, then, the mixture is ignited by the spark plug 9 at the end of the compression stroke.

Figure 4:
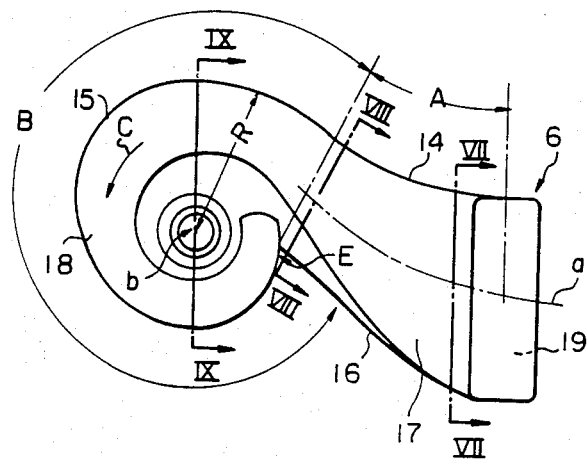
FIG. 4 is a plan view in the direction of the arrow IV in FIG. 3.
Figure 5:
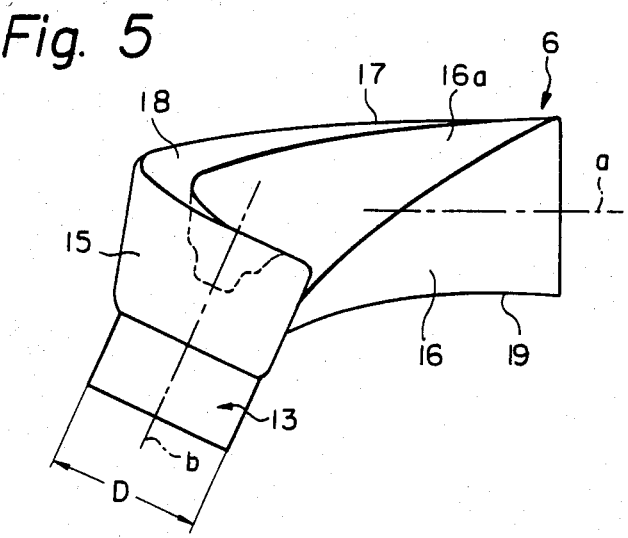
FIG. 5 is a side view in the direction of the arrow V in FIG. 3.
Figure 6:
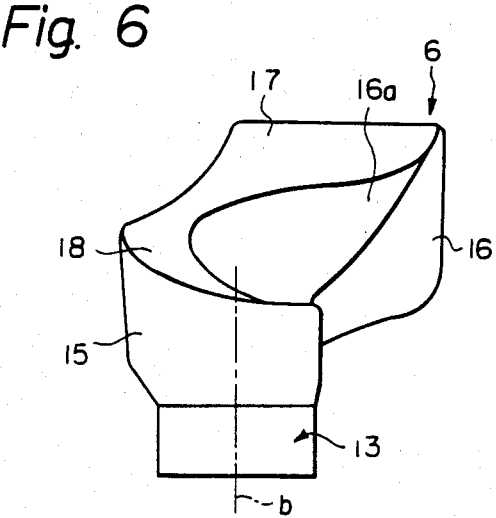
FIG. 6 is a side view in the direction of the arrow VI in FIG. 3.
Figure 7:
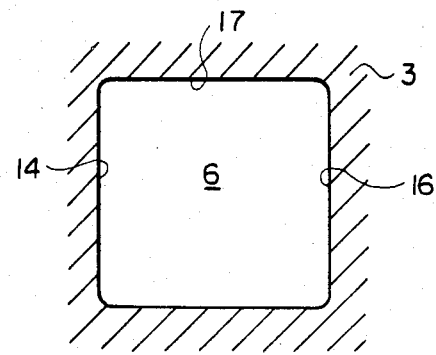
FIG. 7 is a cross-sectional view taken along the line VII—VII in FIG. 4.
Figure 9:
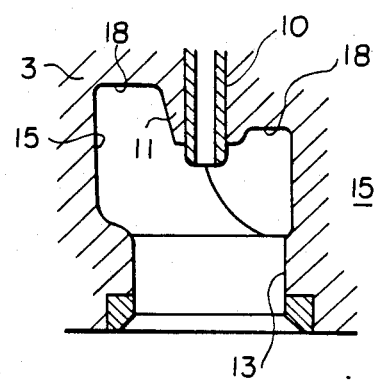
FIG. 9 is a cross-sectional view taken along the line IX—IX in FIG. 4.

FIGS. 3 through 6 schematically illustrate the shape of the helically-shaped intake port 6 illustrated in FIG. 1. As is illustrated in FIG. 4, the helically-shaped intake port 6 according to the present invention comprises an inlet passage portion A and a helical portion B, the longitudinal central axis of the inlet passage portion A being slightly curved. The inlet open end of the inlet passage portion A has a rectangular cross-section as illustrated in FIG. 7, and the mixture outlet portion 13 of the helical portion B has a cylindrical inner wall which extends circumferentially about the helix axis b of the helical portion B. As illustrated in FIG. 1, the helix axis b, that is, the axis of the intake valve 5, is inclined by approximately 23 degrees with respect to the axis of the cylinder, and the inlet passage portion A extends substantially horizontally. The side wall 14 of the inlet passage portion A, which is located remote from the helix axis b, is arranged so as to be substantially vertical and is smoothly connected to the side wall 15 of the helical portion B, which extends circumferentially about the helix axis b. As illustrated in FIGS. 6 and 9, the side wall 15 of the helical portion B is so formed that it expands outwards from the cylindrical inner wall of the mixture outlet portion 13. In addition, as is illustrated in FIG. 4, the side wall 15 is so formed that the distance R between the side wall 15 and the helix axis b is maintained constant at a position near the inlet passage portion A and is gradually reduced towards the helical direction C. The distance R becomes approximately equal to the radius of the cylindrical inner wall of the mixture outlet portion 13 at the helix terminating portion E.

Figure 8:
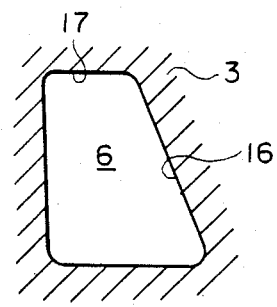
FIG. 8 is a cross-sectional view taken along the line VIII—VIII in FIG. 4.

The side wall 16 of the inlet passage portion A, which is located near the helix axis b, has on its upper portion an inclined wall portion 16a which is arranged to be directed downwards. The width of the inclined wall portion 16a is gradually increased towards the helical portion B and, as is illustrated in FIG. 8, the entire portion of the side wall 16 is inclined at the connecting portion of the inlet passage portion A and the helical portion B. The upper half of the side wall 16 is smoothly connected to the circumferential wall of the cylindrical projection 11, and the lower half of the side wall 16 is connected to the side wall 15 of the helical portion B at the helix terminating portion E of the helical portion B.

As is illustrated in FIGS. 1 and 5, the upper wall 17 of the inlet passage portion A extends substantially horizontally from the inlet open end of the inlet passage portion A towards the helical portion B and is smoothly connected to the upper wall 18 of the helical portion B. This upper wall 18 gradually descends towards the helical direction C (FIG. 4) and is connected to the side wall 16 of the inlet passage portion A. Since the inclined wall portion 16a of the inlet passage portion A is so formed that the width thereof is gradually increased towards the helical portion B as mentioned above, the width of the upper wall 17 of the inlet pasage portion A is gradually reduced. In addition, since the side wall 15 of the helical portion B is so formed that the distance R between the side wall 15 and the helical axis b is maintained constant at a position near the inlet passage portion A and is gradually reduced towards the helical direction C as mentioned above, the width of the upper wall 18 of the helical portion B is gradually reduced towards the helical direction C. Consequently, it will be understood that the upper wall 17 of the inlet passage portion A extends substantially horizontally towards the helical portion B, while the width of the upper wall 17 is gradually reduced, and; that the upper wall 18 of the helical portion B gradually descends towards the helical direction C, while the width of the upper wall 18 is gradually reduced.

As is illustrated in FIGS. 1 and 5, the bottom wall 19 of the inlet passage portion A extends substantially horizontally in parallel with the upper wall 17 towards the helical portion B and is connected to the cylindrical inner wall of the mixture outlet portion 13 via a smoothly curved wall 20 as illustrated in FIG. 1. From FIG. 4, it will be understood that the width of the bottom wall 19 is gradually reduced towards the helical portion B.

In operation, a part of the mixture introduced into the inlet passage portion A moves forward along the upper walls 17 and 18, as illustrated by the arrow K in FIG. 1, and the remaining part of the mixture impinges upon the inclined wall portion 16a and is deflected downwards. As a result, the remaining part of the mixture flows into the mixture outlet portion 13 without swirling, as illustrated by the arrow L in FIG. 1. Since the widths of the upper walls 17 and 18 are gradually reduced towards the flow direction of the mixture as mentioned above, the cross-section of the flow path of the mixture flowing along the upper walls 17 and 18 is gradually reduced towards the flow direction of the mixture. In addition, since the upper wall 18 gradually descends towards the helical direction C, the mixture flowing along the upper walls 17 and 18 is deflected downwards, while the velocity thereof is gradually increased. As a result of this, a swirl motion moving downwards while swirling is created in the helical portion B and, in addition, this swirl motion causes a swirl motion of the mixture flowing into the mixture outlet portion 13, as illustrated by the arrow L in FIG. 1. Then, the mixture moves downwards while smoothly swirling along the cylindrical inner wall of the mixture outlet portion 13 and, thus, a strong swirl motion rotating about the helix axis b is created within the mixture outlet portion 13. Then, this swirling mixture flows into the combustion chamber 4 via the valve gap formed between the intake valve 5 and its valve seat and causes a strong swirl motion in the combustion chamber 4.

In the helically-shaped intake port 6 according to the present invention, the mixture flowing along the upper walls 17 and 18 greatly contributes to the creation of a swirl motion. Consequently, by forming the helically-shaped intake port so that the cross-section of the flow path of the mixture flowing along the upper walls 17 and 18 is gradually reduced towards the flow direction of the mixture as mentioned previously, the flow velocity of the mixture is gradually increased and, as a result, it is possible to create a strong swirl motion in the combustion chamber 4 even if an engine is operating under a light load. In addition, by forming the inclined wall portion 16a as mentioned previously, since a part of the mixture introduced into the inlet passage portion A flows into the mixture outlet portion 13 along the smoothly curved wall 20 without swirling, the flow resistance which the mixture flowing in the helically-shaped intake port 6 is subjected to becomes considerably small as compared with that in a conventional helically shaped intake port. As a result of this, a high volumetric efficiency can be ensured when an engine is operating at a high speed under a heavy load.

Figure 10:
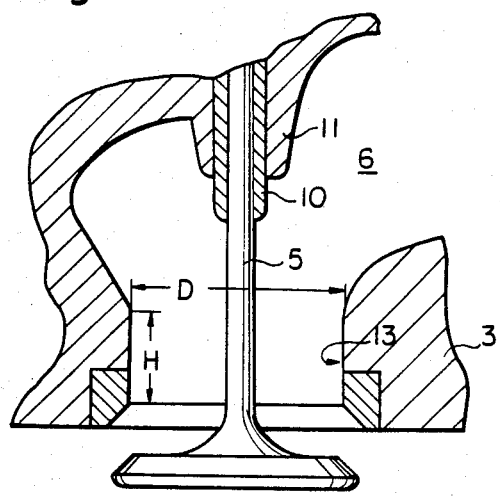
FIG. 10 is an enlarged cross-sectional side view of a part of the engine illustrated in FIG. 1.
Figure 11:
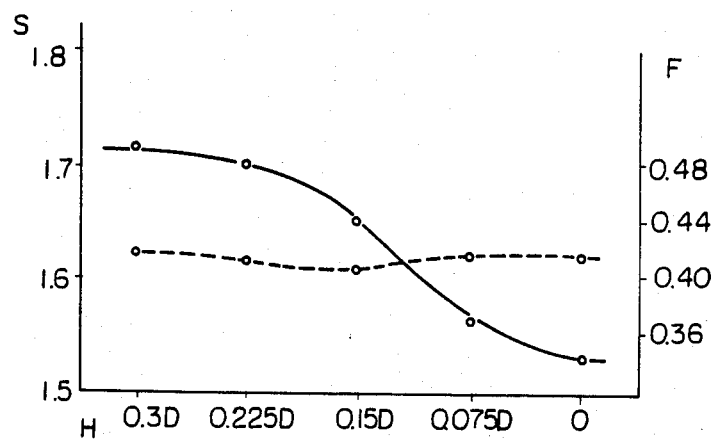
FIG. 11 is graph showing the number of revolutions of a swirl motion per a unit time and a flow coefficient of the helically-shaped intake port.

In addition, the size and the shape of the mixture outlet portion 13 has a great influence on the creation of a swirl motion. This influence will be described with reference to FIGS. 10 and 11. As is illustrated in FIG. 10, in the helically-shaped intake port 6 according to the present invention, the mixture outlet portion 13 of the helical portion B has a cylindrical inner wall arranged coaxially with the axis of the intake valve 5 and having a uniform diameter D over the entire length thereof. In addition, the mixture outlet portion 13 has a height indicated by H in FIG. 2. FIG. 11 shows the results of experiments conducted by changing the height H of the mixture outlet portion 13. In FIG. 11, the ordinate S indicates the number of revolutions of a swirl motion per a unit time in the combustion chamber at a position near the outlet of the helically-shaped intake port in the case wherein a predetermined amount of air is caused to flow within the helically-shaped intake port; the ordinate F indicates flow coefficient of the helically-shaped intake port 6; and the abscissa H indicates the height H of the mixture outlet portion 13. In addition, in FIG. 11, the solid curved line indicates the number of revolutions of a swirl motion per a unit time S, and the broken curved line indicates flow coefficient F. Furthermore, FIG. 11 shows the results of the experiments conducted by using a 4-cylinder internal combustion engine under a constant speed of 2000 r.p.m. and a wide open throttle valve. From FIG. 11, it will be understood that the number of revolutions of a swirl motion per a unit time, that is, the strength of the swirl motion, is increased as the height H of the mixture outlet portion 13 is increased up to approximately 0.225 times of the diameter D of the mixture outlet portion 13. Above that value the number of revolutions of a swirl motion per a unit time is maintained approximately constant, and the height H of the mixture outlet portion 13 has no influence on the flow coefficient F. Consequently, in order to create a strong swirl motion while ensuring a high volumetric efficiency, it is preferable that the mixture outlet portion 13 have a cylindrical shape and, in addition, the mixture outlet portion 13 be so formed that the height H thereof is above approximately 0.225 times the diameter D of the mixture outlet portion 13.

According to the present invention, it is possible to create a strong swirl motion in the combustion chamber when an engine is operating under a light load, while ensuring a high volumetric efficiency when an engine is operating at a high speed under a heavy load.

While the invention has been described by reference to a specific embodiment chosen for purposes of illustration, it should be apparent that numerous modifications could be made thereto by those skilled in the art without departing from the spirit and scope of the invention.

What is claimed is:

1. An intake port of a spark-ignition internal combustion engine, which intake port includes a helical portion having an upper wall, a helically curved peripheral side wall, and an outlet at the bottom of the helix, wherein an intake valve is arranged at said outlet, and said peripheral side wall extends circumferentially about an axis of said intake valve, and an inlet passage portion tangentially connected at one end to said helical portion and having an inlet at its other end, said inlet passage portion being defined by an upper wall, a bottom wall, a first side wall, and a second side wall, said second side wall being more remote from the axis of said intake valve than said first side wall and being connected to the peripheral side wall of said helical portion, wherein said first side wall of said inlet passage portion has an inclined wall portion at said other end, the direction in which said wall portion is inclined being such as to make the width of said inlet passage portion above the lower edge of the inclined wall portion at any point along said inlet passage portion narrower than the width of said inlet passage portion below said inclined wall portion at said point, the width of said inclined wall portion increasing gradually towards said helical portion to comprise the entire first side wall at said one end of said inlet passage portion which is tangentially connected to said helical portion such that the cross-sectional shape of the passage at the entrance to the helical portion is trapezoidal, and the intake port comprising a valve guide projecting into said helical portion from the upper wall of said helical portion and having a circumferential wall, an upper part of said first side wall being tangentially connected to the circumferential wall of said valve guide, and a lower part of said first side wall being connected to the peripheral side wall of said helical portion so as to deflect part of the flow through the intake port downwards toward the outlet of the helical portion while allowing the remainder of the flow to pass around the helically curved peripheral side wall, thereby introducing said part of the flow directly into the combustion chamber with minimum flow resistance while allowing said remainder of the flow to develop a strong swirl motion in the helical portion of the intake port.

2. An intake port as claimed in claim 1, wherein the second side wall of said inlet passage portion is substantially vertical.

3. An intake port as claimed in claim 1, wherein said inlet passage portion has a longitudinal axis which is slightly curved.

4. An intake port as claimed in claim 1, wherein the width of the upper wall of said inlet passage portion gradually decreases towards said helical portion to be increasingly narrower than the lower wall of said inlet passage portion.

5. An intake port as claimed in claim 1, wherein the width of the upper wall of said helical portion gradually decreases in the flow direction of a sucked gas through the intake port.

6. An intake port as claimed in claim 5, wherein the upper wall of said helical portion gradually descends in the flow direction of the sucked gas through the intake port.

7. An intake port as claimed in claim 1, wherein said helical portion further includes an inner wall located near said outlet, and the bottom wall of said inlet passage portion is smoothly connected to said inner wall of said helical portion.

8. An intake port as claimed in claim 7, wherein the width of the bottom wall of said inlet passage portion gradually decreases towards said helical portion.

9. An intake port as claimed in claim 1 comprising, at said outlet, a cylindrical wall coaxial with said intake valve, the axial length of said cylindrical wall being greater than approximately 0.225 times the diameter of said cylindrical wall.

10. An intake port as claimed in claim 9, wherein the peripheral side wall of said helical portion is expanded outwards from the cylindrical inner wall of said helical portion.

* * * * *